Patented June 28, 1932

1,865,111

UNITED STATES PATENT OFFICE

HANS KAUFMANN, OF JENA, GERMANY

PROCESS FOR PREPARING COMPOUNDS OF ALKALINE EARTH METAL NITRITES WITH METHYL XANTHINES AND THE PRODUCTS

No Drawing. Application filed May 3, 1929, Serial No. 360,309, and in Germany May 7, 1928.

The nitrites are the most powerful inorganic vascular agents, that is medicinal substances which act upon the blood vessels. Of these sodium nitrite has hitherto played a predominant part. It has, however, been found that the alkaline earth metal nitrites, particularly calcium nitrite, are with advantage used for the purpose, as in this case the cation, for example the calcium, is said to exert a favorable action. With the idea of strengthening the vascular action by the simultaneous use of a purine base, attempts were made to prepare compounds from the alkaline earth metal nitrites and methyl xanthines.

It has now been found that caffeine combines with alkaline earth metal nitrites to form compounds, which are characterized by a better water solubility than that of the basic substance, caffeine. They are, however, very loosely combined and decompose slowly into their components, for example, when their solutions are allowed to stand for any length of time. In the case of theobromine and theophylline the alkaline earth metal salts are employed as the bases themselves do not yield clearly characterizable double salts with alkaline earth nitrites, as do their alkaline earth metal salts. Thus, for example, the only slightly soluble calcium salt of theobromine dissolves if calcium nitrite in a small quantity of water is added. The new compound is water-soluble and stable in air. The alkaline earth metal salts of the xanthine bases, which may be obtained in the usual manner, may be employed for the preparation. It is, however, also possible to bring the free bases together with an alkaline earth metal hydroxide (or oxide) and the alkaline earth metal nitrites directly into aqueous solution. The solution, which takes place on slight warming is, if necessary, filtered, in order to remove traces of carbonate, and evaporated to dryness, preferably in a vacuum.

The compounds are applicable for therapeutic purposes.

Examples 1. 21 parts of caffeine and 15 parts of calcium nitrate (containing 1 mol of water of crystallization) are mixed into 100 parts of water. On evaporating the solution a non-hygroscopic compound remains which is soluble in water at 25° C. in the proportion of 1:20.

2. 21 parts of caffeine and 22.9 parts of barium nitrite are treated in a manner similar to that in Example 1. The compound which, at the start, dissolves in water to a clear solution decomposes on long standing of the aqueous solution.

3. 39.8 parts of the calcium salt of theobromine (or theophylline) are brought together with 15 parts of calcium nitrite and 200 parts of water with slight heating. Solution takes place. After filtering, the clear solution is evaporated to dryness in a vacuum. The compound dissolves readily in water and, after carefully drying, is stable in air.

4. 36 parts of theobromine (or theophylline) and 7.4 parts of calcium hydroxide in the form of milk of lime (or 5.6 parts of calcium oxide and 100 parts of water) are treated with 15 parts of calcium nitrite. The compound described in Example 3 is obtained.

5. 26.7 parts of the strontium salt of theophylline are dissolved in 17.9 parts of strontium nitrite and 100 parts of water. The compound remaining on evaporation is soluble in water in about the proportion of 1:12.

The formulæ of the final products can be found on the basis of the fact that the present compounds are molecular compounds and are of a complex chemical nature containing water incorporated in the compound. Of the compounds forming part of this application only the calcium nitrite theobromine has been studied to some extent. The formula for this theobromine compound, if theobromine is designated for the sake of simplicity with "Th", has been found as being:

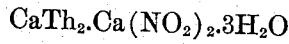
$CaTh_2.Ca(NO_2)_2.3H_2O$

I claim:

1. A process for preparing compounds of alkaline earth metal nitrites with methyl xanthines wherein solutions of alkaline earth nitrites are caused to react with alkaline earth metal salts of theobromine.

2. A process for preparing compounds of alkaline earth metal nitrites with methyl xanthines wherein solutions of alkaline earth metal nitrites are caused to react with theobromine in the presence of an alkaline earth metal oxide.

3. A process for preparing a compound of theobromine with an alkaline earth metal nitrite comprising the steps of bringing an alkaline earth metal salt of theobromine and an alkaline earth metal nitrite into contact with water, slightly heating the mixture, filtering and evaporating the clear solution, preferably in a vacuum.

4. A process for preparing a compound of theobromine with an alkaline earth metal nitrite comprising the steps of bringing theobromine, an alkaline earth metal hydroxide and an alkaline earth metal nitrite into contact with water, slightly heating the mixture, filtering and evaporating the clear solution, preferably in a vacuum.

5. As a new product of manufacture, a compound of an alkaline earth metal nitrite with a methyl xanthine.

6. As a new product of manufacture, a compound consisting of an alkaline earth metal nitrite and methyl xanthines.

7. As a new product of manufacture, a compound consisting of an alkaline earth metal nitrite and a methyl xanthine calcium.

8. As a new product of manufacture, a compound consisting of an alkaline earth metal nitrite and theobromine calcium.

9. As a new product of manufacture, a compound consisting of calcium nitrite and theobromine calcium.

In testimony whereof I affix my signature.

HANS KAUFMANN.